Figure 1:
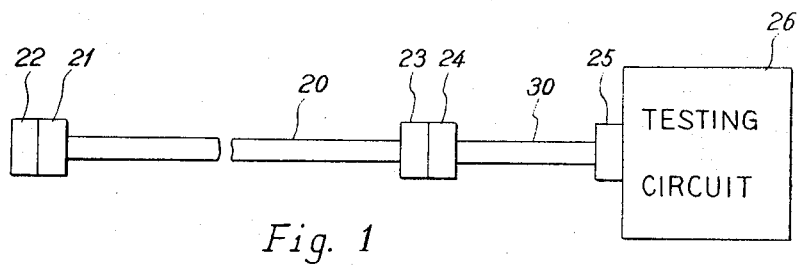

United States Patent

[11] 3,594,635

| [72] | Inventors | Mitsuo Minamii<br>Yokohama-shi;<br>Kimiyishi Sasaki, Sagamihara-shi; Takashi Saito, Hatano-shi, all of, Japan |
|---|---|---|
| [21] | Appl. No. | 772 |
| [22] | Filed | Jan. 5, 1970 |
| [45] | Patented | July 20, 1971 |
| [73] | Assignee | Stanley Denki Kabushiki Kaisha (a/k/a Stanley Electric Co., Ltd.)<br>Tokyo-to, Japan |
| [32] | Priority | May 13, 1969 |
| [33] | | Japan |
| [31] | | 44/36317 |

[54] MULTICONDUCTOR-ELECTRIC-CABLE TESTING DEVICE HAVING TWO CONNECTION ADAPTERS FOR DIVIDING THE CABLE CONDUCTORS INTO A PLURALITY OF GROUPS OF SERIES-CONNECTED CONDUCTORS
4 Claims, 4 Drawing Figs.

[52] U.S. Cl. .................................................. 324/51, 324/54, 324/73
[51] Int. Cl. ............................................... G01r 31/02

[50] Field of Search .......................................... 324/51, 66, 54, 73

[56] References Cited
UNITED STATES PATENTS

| 2,822,519 | 2/1958 | Murphy ....................... | 324/66 |
| 2,964,701 | 12/1960 | Argarbright ................ | 324/66 X |
| 3,430,135 | 2/1969 | Mullen ........................ | 324/51 |
| 3,528,104 | 9/1970 | Ehlschlager ................ | 324/51 |

Primary Examiner—Gerard R. Strecker
Attorney—Yoshio Katayama

ABSTRACT: An automatic testing device for a multiconductor electric cable two ends of which are respectively connected to two connectors, where conductors of the multiconductor electric cable are divided into a plurality of groups of series-connected conductors by connecting respectively two connection adapters to said two connectors. Respective paired terminals of the groups of series-connected conductors are connected to a plurality of testing means successively testing in an automatic manner whether or not each of the series-connected conductors forms a complete series connection. The test results of the testing means are displayed by display means.

INVENTORS
MITSUO MINAMII
KIMIYOSHI SASAKI
TAKASHI SAITO

MULTICONDUCTOR-ELECTRIC-CABLE TESTING DEVICE HAVING TWO CONNECTION ADAPTERS FOR DIVIDING THE CABLE CONDUCTORS INTO A PLURALITY OF GROUPS OF SERIES-CONNECTED CONDUCTORS

This invention relates to testing devices for multiconductor electric cables and more particularly to devices for performing high-speed automatic testing of conductors in a cable connected to connectors.

To perform testing of conductors of a multiconductor electric cable in conventional art, conductors are tested for each of the conductors or each pair of the conductors by use of a buzzer, a bell or a current indicator connected to a DC current source, such as dry cell, in consideration of corresponding insulators colored with different colors or marked with different numerals. In this case, at least two operators are required at two ends of the cable except the length of the cable is very short, and the operators must communicate with one another by hands, with voice or by the use of a walkie-talkie or the like. Moreover, this conventional method of testing a cable is very complicated, troublesome and uneconomical in time and requires the skilled operators.

An object of this invention is to provide a testing device for a multiconductor electric cable for performing high-speed automatic testing of connections to connecters of conductors in the cable by only one unskilled operator.

Another object of this invention is to provide such testing device for a multiconductor electric cable capable of performing further testing of insulation resistances between two groups of conductors in the cable.

To attain said objects and other objects of this invention, a plurality of conductors in a cable to be tested are divided into a plurality of groups of series-connected conductors. For this division, a first connection adapter having a plurality of series-connected pairs of terminals is connected to a first connector connected to one end of the cable. The number of terminals of the first connection adapter is equal to the number of conductors in a cable. A second connection adapter having a plurality of terminals is connected to a second connector connected to the other end of the cable.

Usually, some pairs of terminals of the second connection adapter are respectively series-connected to each other in each of the pairs. Accordingly, a plurality of conductors in the cable to be tested are divided into a plurality of groups of series-connected conductors, end terminals of which correspond to terminals of the second connection adapter except said series-connected pairs of terminals of the second connection adapter. Said end terminals of a plurality of the groups of series-connected conductors are connected respectively to corresponding terminals of a testing circuit. This testing circuit comprises a plurality of connection-testing means which perform functions; (1) if connections of the conductors of the cable to the first and second connectors are all correct, a plurality of said connection-testing means are successively energized in numerical order; (2) said successive energization are indicated by successive lightings of a plurality of pilot lamps respectively corresponding to a plurality of said groups of series-connected conductors; (3) each of a plurality of said testing means has a self-holding means which is released in response to energization of the just succeeding one of a plurality of said testing means. If a plurality of said testing means are constructed by use of a plurality of relays, this relay circuit is formed as follows to perform said functions: (i) terminals of said series-connected conductors are connected in series to respective energization circuits of the relays; (ii) the energization circuit of a relay employed for testing a first group of said series-connected conductors includes break-contacts of all the relays of said testing means to energize at first the relay for testing the first group of said series-connected conductors; (iii) each of the energization circuits of the relays is self-held by a make-contact of the corresponding relay; (iv) a succeeding relay is energized in response to close of a make-contact of a just preceding relay; (v) said self-holding state of each of the relays are released in response to open of a break-contact of a just succeeding relay; and (vi) energization of a plurality of said relays are indicated by corresponding pilot lamps respectively turned on by respective make-contacts of the relays. In said construction, the testing device of this invention is possible to test whether or not connections to the first and second connectors of multiconductors in the cable to be tested are correct. Test results of this testing device are indicated by a plurality of said pilot lamps as described in detailed below.

In accordance with another feature of this invention, the testing device of this invention is provided with means for measuring insulation resistances between two groups of series-connected conductors in the cable to be tested. This means performs this measuring function by comparing an unknown insulation resistance with a scaled value of a variable resistance manually handled on reference to a suitable indication means or by indicating on a scale of a direct-current meter a current corresponding to an unknown insulation resistance.

Figure 2:
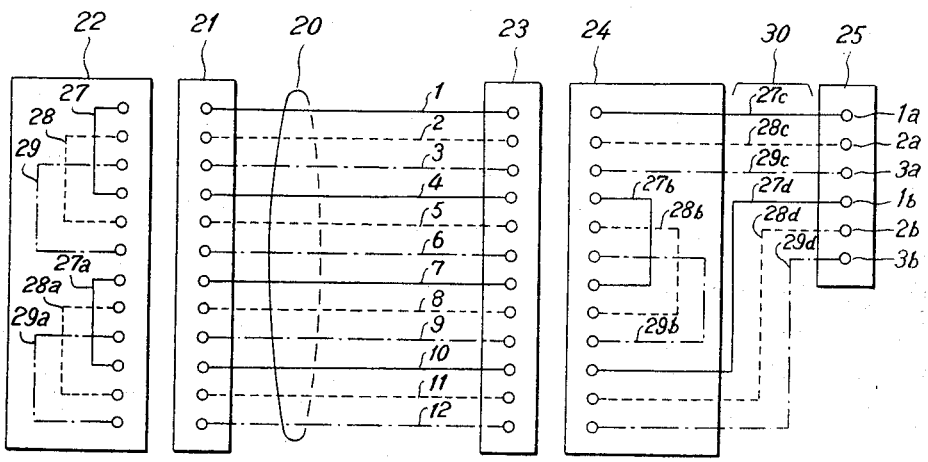
Figure 3:
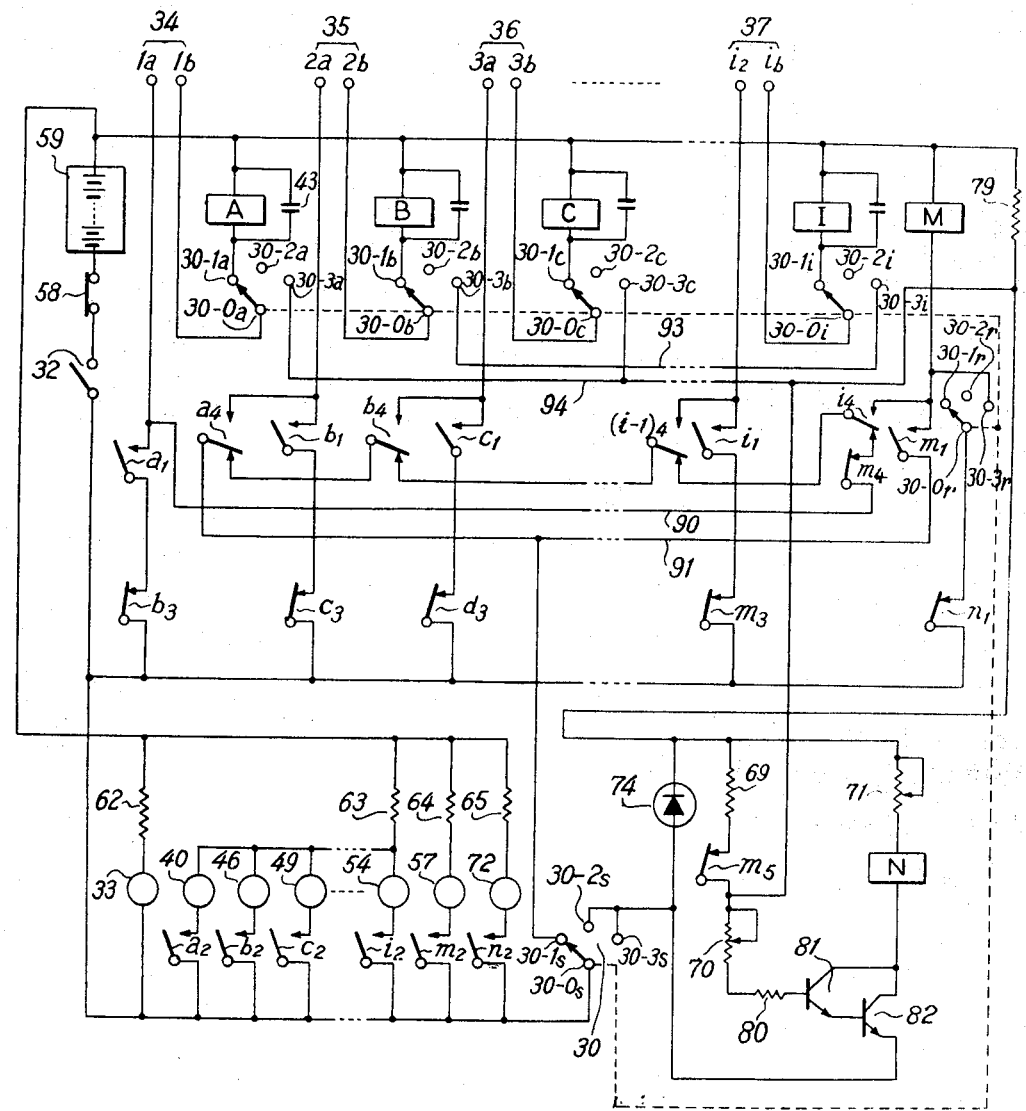
Figure 4:
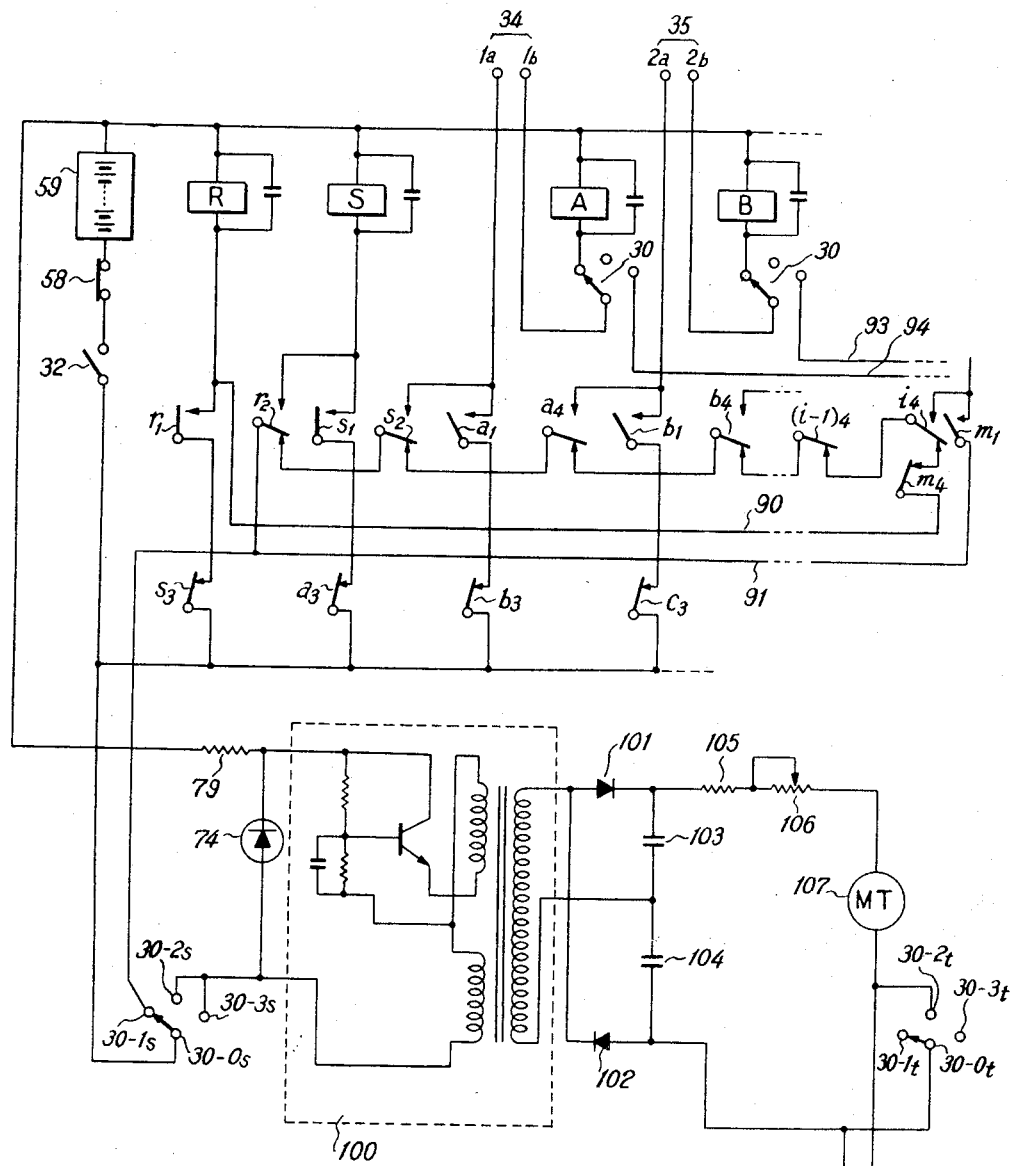

The principle, construction and operation of the testing device of this invention will be better understood from the following more detailed discussion in conjunction with the accompanying drawings, in which the same or equivalent parts are designated by the same reference numerals, characters and symbols, and in which:

FIG. 1 is a schematic view explanatory of connection principle of a cable to be tested to adapters and a test circuit in accordance with this invention;

FIG. 2 is a connection diagram explanatory of connection principle of a cable to be tested to adapters and a testing circuit in order to divide the conductors of the cable into a plurality of series-connected conductors in accordance with this invention; and FIGS. 3 and 4 are each a connection diagram for illustrating an example of a testing circuit for testing connection and insulation resistance of a cable to be tested.

With reference to FIGS. 1, 2 and 3, a preferred embodiment of this invention will now be described. In FIG. 1, a cable 20 to be tested includes a plurality of conductors. To one end 21 of this cable 20 is connected a connection adapter 22 while to the other end 23 of the cable 20 is connected a testing adapter 24 which is connected through a connection cable 30 and a connection adapter 25 to a testing circuit 26. Two ends of the cable 20 are connected to jack or plug connectors 21 and 23 respectively.

Referring to FIG. 2, it is assumed that the cable 20 has twelve conductors designated by reference numerals 1 to 12. In order to divide these conductors 1 to 12 into three groups of series-connected conductors by way of example, the connection adapter 22 (the first adapter) is provided with twelve terminals which are paired off as shown in FIG. 2, thereby providing six pairs of connected terminals. In other words, a pair of connected terminals 27 and 27a of the connection adapter 22 belong to a first group, a pair of connected terminals 28 and 28a thereof belong to a second group, and a pair of connected terminals 29 and 29a thereof belong to a third group. The testing adapter 24 (the second adapter) is also provided with 12 terminals. Except upper three terminals and lower three terminals, other six terminals of the testing adapter 24 are paired as shown in FIG. 2 thereby providing three pairs 27b, 28b and 29b of connected terminals. The upper three and lower three terminals of the testing adapter 24 are connected to the connection adapter 25 through connecting conductors (27c, 28c and 29c) and (27d, 28d and 29d) of the connection cable 30 respectively. Terminals of the connection adapter 25 are designated by reference numerals 1a, 2a, 3a, 1b, 2b and 3b and connected to the testing circuit 26.

Thus the conductors and terminals of the first group are connected in series in the order of 1a, 27c, 1, 27, 4, 27b, 7, 27a, 10, 27d and 1b; those of the second group, 2a, 28c, 2, 28, 5, 28b, 8, 28a, 11, 28d and 2b as shown by dotted lines in FIG.

2; and those of the third group, $3a$, $29c$, 3, 29, 6, $29b$, 9, $29a$, 12, $29d$ and $3b$ as shown by chain lines. It will be clear that the 12 conductors are divided into three groups and they are connected in series in each group to establish three series-connected circuits of conductors. Even if the number of conductors in the cable 20 to be tested is very large, the "apparent" number of conductors can be reduced by dividing the conductors of the cable 20 into an appropriate number of groups of connected conductors.

FIG. 3 shows an example of the testing circuit 26 for testing in turn whether or not each of 1st to $i$th groups of connected conductors in a correct series-connected circuit. In this testing circuit 26, a plurality of pairs of terminals 34, 35, 36, .... 37 are provided to be connected to respective pairs of terminals ($1a$ and $1b$), ($2a$ and $2b$), ($3a$ and $3b$), .... ($i_a$ and $i_b$) of the testing connector 25. Relays A, B, C, ... I are provided to test in turn the 1st to $i$th groups of connected conductors respectively connected to said pairs of terminals 34, 35, 36, ... 37. Pilot lamps 40, 46, 49, ... 54 are provided to display results of the test operations performed by the testing circuitry comprising the relays A, B, C .... I. A rotary switch 30 is provided to change modes of said test operations. A DC current source 59 is provided to supply a DC current to each of the relays A, B, C, ... I through connected conductors which are respectively connected to said pairs of terminals 34, 35, 36 and 37. A pushbutton switch 58 is provided for turning off the power source 59, such as dry battery, only when a cover of this device is closed while the switch 32 is remained at the "ON" state.

In operation, after confirming that the rotary switch 30 is switched to testing terminals $30$-$1a$, $30$-$1b$, $30$-$1c$, ... $30$-$1i$, the switch 32 is closed so that a pilot lamp 33 is turned on, thereby indicating the power is being supplied to the testing circuitry. When the cable 20 is correctly connected to the connectors 21 and 23, the testing terminals 34 of the 1st group are short circuited through the series-connected conductors of the 1st group so that the relay A is at first energized in a loop: the DC source 59, the relay A, contacts $30$-$1a$ and $30$-$Da$, terminals $1b$ and $1a$, contacts $m_4$, $i_4$, $(i\text{-}1)_4$, .... $b_4$, $a_4$, $30$-$1_s$ and $30$-$O_s$ and switches 32 and 58 so as to close its contact $a_1$. Accordingly, the relay A is maintained in the self-holding state thereof. Simultaneously, another contact $a_2$ of the relay A is closed so that the pilot lamp 40 is turned on. The lighting of this pilot lamp 40 indicates that the conductors in this 1st group are correctly connected without any disconnection and cross wiring. When a contact $a_4$ of the relay A is switched in response to the energization of the relay A, the testing terminals 35 of the second group are short circuited through series-connected conductors of the 2nd group and the relay B is energized so that its contact $b_3$ is opened, thereby deenergizing the relay A. In this case, however, this deenergization of the relay A is delayed by a predetermined time during which a capacitor 43 in the testing circuitry for the first group of connected conductors is discharged. Thus, the pilot lamp 40 remains lighted during the predetermined time. A contact $b_1$ of the relay B is closed in response to the energization of the relay B so that the relay B is self-held while a contact $b_2$ of the relay B is closed so that the pilot lamp 46 is turned on. When a contact $b_4$ of the relay B is closed in response to the energization of the relay B, the testing terminals 36 of the third group are short circuited through series-connected conductors of the 3rd group so that the relay C is energized. In a similar manner as described above, a contact $c_2$, the pilot lamp 49 and a contact $c_1$ are automatically turned on. When the relay I of the testing circuitry for the $i$th group is energized after groups of the connected conductors are sequentially tested, contacts $i_1$, $i_4$ and $i_2$ of the relay I are switched so that a pilot lamp 54 is turned on and a relay M is energized, thereby opening its contact $m_3$ so as to deenergize the relay I. The contacts of the relay I are opened after a predetermined time and the pilot lamp 54 is turned off.

If any one or more of the conductors of the cable 20 is/are erroneously connected to terminals of the conductors 21 and 23, the test circuit 26 operates in the following manners in accordance with conditions of the errors:

i. Cross-connection:

a. If adjacent (consecutive) two conductors (e.g.; 1 and 2; or 2 and 3) of the cable 20 are cross connected to the terminals of the conductors 21 and 23, the test circuit 26 operates as follows:

a-i. If two conductors 1 and 2 are cross connected, the terminals $1a$ and $1b$ are short circuited, through respective series-connected conductors, to the terminals $2b$ and $2a$ respectively. Therefore, the relay B is energized at first since the energization current of the relay B flows in a loop circuit: the DC current source 59—the relay B—contacts $30$-$1b$ and $30$-$0b$ of the rotary switch 30—the terminal $2b$—the series-connected conductors ($28d$-$11$-$28a$-$8$-$28b$-$5$-$28$-$1$-$27c$)—the terminal $1a$—contacts $m_4$, $(i\text{-}1)_4$, ...., $b_4$, $a_4$, $30$-$1s$ and $30$-$0s$—the switch 32—the switch 58—the DC source 59. Accordingly, the contacts $b_1$, $b_2$, $b_{33}$ and $b_4$ of the relay B are switched. In response to the close of the contact $b_2$, the pilot lamp 46 is lighted. Moreover, when the contact $b_1$ is closed in response to the energization of the relay B, the relay A is also energized since the energization current of the relay A flows in a loop circuit: the DC current source 59—the relay A—contacts $30$-$1a$ and $30$-$0a$ of the rotary switch 30—the terminal $1b$—series-connected conductors ($27d$-$10$-$27a$-$7$-$27b$-$4$-$27$-$2$-$28c$)—the terminal $2a$—the contacts $b_1$ and $c_3$—the switch 32—the switch 58—the DC current source 59. Accordingly, the contacts $a_1$, $a_2$ and $a_4$ are switched. In response to the switch operation of the contact $a_4$, the relay A is self-held, so that the pilot lamp 40 is continuously lighted by the contact $a_2$ closed. However, the relay B is deenergized in response to the switch operation of contacts $a_4$ and $b_4$, so that the contacts $b_1$, $b_2$, $b_3$ and $b_4$ are switched. In response to the close operation of the contact $b_3$, the relay B is reenergized since the contact $a_1$ is closed by the self-holding of the relay A. Since the contact $b_3$ is opened by the energization of the rely B, so that the relay B is then deenergized. These energization and deenergization of the relay B are alternately repeated. Accordingly, the pilot lamp 46 are alternately lighted and put out. Consequently, a pilot lamp for the former (first) of the groups (fist and second) of the cross connected conductors is continuously lighted while a pilot lamp for the later (second) of the groups (first and second) of the cross connected conductors in this condition of misconnection is alternately turned on and off.

a-2. If two conductors 2 and 3 are cross connected to the terminals of the connectors 21 and 23, the terminals $2a$ and $2b$ are short circuited, through respective series-connected conductors, to terminals $3b$ and $3a$ respectively. In this case, after the pilot lamp 40 is turned on and turned off, the pilot lamp 49 is alternately turned on and turned off while the pilot lamp 46 is continuously lighted. These operations are similarly understood on reference to the operations in the above item a-1, details are omitted.

b. If inconsecutive two conductors (e.g.; 1 and 3) of the cable 20 are cross connected to the terminals of the conductors 21 and 23, the test circuit 26 operates as follows:

In this case, the terminals $1a$ and $1b$ are short circuited, through respective series-connected conductors, to terminals $3b$ and $3a$ respectively. Therefore, the relay C is energized at first since the energization circuit of the relay C flows in a loop circuit: the DC current source 59—the relay C—contacts $30$-$1c$ and $30$-$0c$ of the rotary switch 30—the terminal $3b$—the series-connected conductors ($29d$-$12$ -$29a$-$9$-$29b$-$6$-$29$-$1$-$27c$)—the terminal $1a$—contacts $m_4$, $i_4$, $(i\text{-}1)_4$, ...., $b_4$, $a_4$, $30$-$1a$ and $30$-$0s$—the switch 32—the switch 58—the DC current source 59. Accordingly, the contacts $c_1$, $c_2$, $c_3$ and $c_4$ (not shown) of the relay C is switched. In response to the close of the contact $c_2$, the pilot lamp 49 is lighted. Moreover, when the contact $c_1$ is closed in response to the energization of the relay C, the relay A is also energized since the energization current of the relay A flows in a loop circuit: the DC current source 59—the relay A—contacts $30$-$1a$ and $30$-$0a$ of the rotary switch 30—the terminal $1b$—series-connected conductors ($27d$-$10$-$27a$-$7$-$27b$-$4$-$27$-$3$-$29c$)—the terminal $3a$—the contacts $c_1$ and $d_3$—the switch 32—the switch 58—the DC current source 59. Accordingly, the contacts $a_1$, $a_2$ and $a_4$ are switched so that the pilot lamp 40 is lighted by the contact $a_2$ closed. On the other hand, the relay B is energized in response to the switch operation of the contact $a_4$ through terminals $2b$ and $2a$ which are short circuited by the correctly connected conductors of the second group. Consequently, the contacts $b_1$, $b_2$, $b_3$ and $b_4$ are switched so that the pilot lamp 46 is lighted. However, since the relay C is deenergized in response to the open operation of the contact $b_3$, the pilot lamp 49 is turned off in response to the open operation of the contact $c_2$. Moreover, since the contact $c_1$ is opened in response to the deenergization of the relay C, the relay A is deenergized in response to the breakdown of the loop circuit flowing therethrough the forementioned energization current of the relay A. Accordingly, the contact $a_4$ is restored so that the relay B is deenergized. After the restoration of the relay B, the above-mentioned operations are repeated. Therefore, the pilot lamp 49, 40 and 46 are repeatedly turned on and turned off successively.

ii. Short circuit:

a. If adjacent (consecutive) two conductors (e.g.; 1 and 2; or 2 and 3) of the cable 20 forms a short circuit therebetween by a fault, the test circuit 26 operates as follows:

In this case, the terminals $1a$ and $2a$ are short circuited, through respective series-connected conductors of the first and second groups, to the terminals $1b$ and $2b$ respectively while the terminals $1a$ and $2a$ are short circuited to each other by fault. Accordingly, the terminals $1a$, $1b$, $2a$ and $2b$ are all short circuited to one another. In this case, the relays A and B are simultaneously energized through a loop circuit including the contacts $m_4,i_4,(i-1)_4,b_4,a_4$, the relays A and B are simultaneously self-held in response response to the close of the contact $b_1$. On the other hand, since the contacts $a_4$ and $b_4$ are switched, the relay C cannot be energized. As the result of the above operation, only the pilot lamps 40 and 46 are continuously lighted.

b. If consecutive three or more conductors of the cables 20 forms a short circuit to one another by a fault, pilot lamps indicating the corresponding groups of series-connected conductors are continuously lighted. Since this operation can be readily understood from the operation of the above item ii-a, details are omitted.

c-1. If inconsecutive two conductors (e.g., 1 and 3) of the cable 20 forms a short circuit therebetween by a fault, the test circuit 26 operates as follows:

In this case, the terminals $1a$ and $3a$ are short circuited, through respective series-connected conductors of the first and second groups, to the terminals $1b$ and $3b$ respectively while the terminals $1a$ and $3a$ are short circuited to each other by the fault. Accordingly, the terminals $1a$, $1b$, $3a$ and $3b$ are all short circuited to one another. Therefore, the relay A and C are simultaneously energized through a loop circuit including the contacts $m_4$, $i_4$, $(i-1)_4$, ...., $b_4$, $a_4$, $30\text{-}1s$ and $30\text{-}1s$, so that the relay A and C are simultaneously self-held in response to the close of the contact $c_1$. Moreover, the relay B is energized and self-held in response to switch of the contact $a_4$. On the other hand, since the contacts $a_4$, $b_4$ and $c_4$ (not shown) are switched, the relay D (not shown) cannot be energized. As the result of the above operations, only the pilot lamps 40, 46 and 49 are continuously lighted.

C-2. If inconsecutive two conductors (e.g.,; 1 and 4) of cable 20 forms a short circuit, the test circuit 26 operates as follows:

In this case, the pilot lamps 40 and 46 and a pilot lamp (not shown) for indicating the test result of the fourth group of series-connected conductors are continuously lighted as understood on reference to the operations of the above item c-1. However, the relay C cannot be energized since the contacts $a_4$ and $b_4$ are simultaneously switched, while the succeeding relays E, F .. (not shown) cannot be energized.

As understood from the above discussion, if two or more pilot lamps are continuously lighted, it is known that at least two groups of series-connected conductors corresponding to the first and last ones of the continuously lighted pilot laps form a short circuit by a fault.

iii. Disconnection or breakdown

If any one of the groups of the series-connected conductors is disconnected at any terminal or broken down at any conductor by a fault, since the relay belonging to the group of this disconnection or breakdown cannot be energized, the pilot lamp for indicating the test result of a group of series-connected conductors just preceding to the group of this disconnection or breakdown is lighted continuously.

As mentioned above, the testing circuit 26 comprising the relays A, B, C, ... I and M performs said successive testing of the respective groups of connected conductors. In this testing circuit 26, all of contacts $a_4$, $b_4$, ... $(i\text{-}1)_4$, $i_4$ and $m_4$ are provided to turn on at first the relay A before turning on of succeeding relays B, C, .... I. Moreover, each of the contacts $a_4$, $b_4$, .... and $(i\text{-}1)_4$ operates to energize successively the just succeeding one of the respective relays B, C, .... I. Each of the relays A, B, C. .... I has a contact $a_1$, $b_1$, $c_1$, .... or $i_1$ operating as means for self-holding the corresponding one of the relays A, B, C, .... I. In each of respective self-holding circuits of the relays A, B, C, .... I, a contact $b_3$, $c_3$, $d_3$, ... or $m_3$ opened in response to energization of the just succeeding relay of the self held relay is provided to release the self-holding state of each of the relays A, B, C, .... I.

The cable tester of this invention is possible to measure the insulation resistance between two sets of connnected conductors, to one of which said series-connected conductors in odd numbers of groups belong and to the other of which said series-connected conductors in even numbers of groups belong by way of example. To perform this measurement, the cable tester of this invention is provided wit a relay N, a Zener diode 74, transistors 81 and 82, resistors 69, 70, 71, 79 and 80 and the rotary switch 30. The resistor 69 has a reference resistance and the resistor 70 is a variable resistor having a maximum resistance substantially equal to twice the reference resistance.

In operation the rotary switch 30 is at first switched to its neutral contacts to perform preadjustment of this measurement. In this case, all of the series-connected conductors of the cable 20 are disconnected from this measurement circuit at neutral contacts $30\text{-}2a$, $30\text{-}2b$, $30\text{-}2c$ ... $30\text{-}2i$ and the contacts $a_1$, $b_4$, $b_1$, $b_4$, $c_1$, ... $(i\text{-}1)_4$ and $i_4$. On the other hand, since the relay M is deenergized at this time, a contact $m_5$ of the relay M is closed. Thereafter, the resistance of the resistor 70 is adjusted so as to be equal to the reference resistance of the resistor 69. In this condition, the resistance of the variable resistor 71 is adjusted until completion of the energization of the relay N. When the relay N is energized, a contact $n_2$ of the relay N is closed so that a pilot lamp 72 is turned on.

After completion of the above preadjustment, the resistance of the variable resistance 70 is adjusted to its maximum value so that the relay N is restored. At the same time, the rotary switch 30 is switched to "insulation test" position of right side contacts $30\text{-}3a$, $30\text{-}3b$, $30\text{-}3c$, .... $30\text{-}3i$, $30\text{-}3s$, so that the relay M is energized. At this time, the contact $m_5$ is opened and the pilot lamp 57 is turned on.

If the resistance of the variable resistor 70 is thereafter adjusted gradually to the decrease direction while the base current of the transistor 81 increases, the corrector currents of the transistors 81 and 82 increase so that the relay N is again energized at an appropriate value of the corrector currents. In response to the energization of the relay N, the contact $n_1$ of the relay N is opened so that the relay M is deenergized. Accordingly, the pilot lamp 57 is turned off in response to the open of the contact $m_2$ of the relay M while the pilot lamp 72 is turned on in response to the close of the contact $n_2$ of the relay N.

In this case, said reduced value of the resistance of the resistor 70 until said turn-on of the pilot lamp 72 from the lighting state of the pilot lamp 57 corresponds to an insulation resistance to be measured. This will be understood from the following theoretical discussion.

The reference resistance $R_1$ of the resistor 69 and the maximum resistance $R_o$ of the resistor 70 have the following relationship as understood from the above-mentioned condition:

$$2R_1 = R_o \quad (1)$$

In case of said preadjustment, the following condition is satisfied, where "$R_2$" is the adjusted value of the variable resistor 70.

$$R_1 = R_2 \quad (2)$$
$$R_1 + R_2 = R_o \quad (3)$$

Accordingly, if it is assumed that variable resistor 70 has a resistance $R_{2a}$ in case of reenergization of the relay N, the following relationship for the insulation resistance $R_x$ to be measured is satisfied:

$$R_x + R_{2a} = R_0 \quad (4)$$

Therefore, $$R_x = R_o - R_{2a} \quad (5)$$

The indication scale of the variable resistor 70 is reversely indicated since the insulation resistance $R_x$ is indicated by a difference $(R_o - R_{2a})$ shown in equation (5). In the above discussion, the resistance of the resistor 80 is neglected since this resistance is very small in comparison with the insulation resistance $R_x$ to be measure.

The Zener diode 74 is employed to maintain the voltage applied to this insulation measuring circuit constant. If the voltage of a dry cell or cells used as the DC source 59 is lower than the Zener voltage of the Zener diode, the relay N cannot be energized even if the variable resistor 71 is set to its minimum value so that the pilot lamp 72 will not be turned on. In this case, the dry cells in the power source 59 must be replaced by a new cell or cells.

In the above example of the test circuit 26 of this invention, the following misoperation may occur in a particular mode of cross connection. Namely, if inconsecutive two conductors (e.g.; 1 and 3) of the cable 20 are cross-connected to the terminals of the conductors 21 and 23, the pilot lamps 49, 40 and 46 must be repeatedly turned on and turned off successively. However, the following misoperations occur frequently so that (i) the pilot lamp for indicating the test result of the first group of series-connected conductors flickers, (ii) the pilot laps for indicating respectively test results of the second and fourth groups of series-connected conductors are continuously turned on, and (iii) the pilot lamp for indicating the test result of the third group of series-connected conductors is turned off after a flash thereof. The reason for this is as follows. In this case, since terminals 1a and 1b are short circuited through respective series-connected conductors to terminals 3b and 3a respectively. Therefore, the relay C is at first energized as described above and the pilot lamp 49 is tuned on in response to the close of the contact $c_2$ of the relay C. Accordingly, the contact $c_4$ (not shown) connected to the succeeding terminal 4a (not shown) similarly to contacts $a_4$ and $b_4$ is switched so that a succeeding relay D (not shown) is energized and self-held by a contact $d_1$ (not shown) connected to the terminal 4a (not shown) similarly as contacts $b_1$ and $c_1$. In response to the self-hold of the relay D, a pilot lamp (not shown) for indicating the test result of the fourth group of series-connected conductors is continuously lighted. At the same time, the relay A is deenergized since a contact $d_3$ of the relay D is opened. In response to the deenergization of the relay A, the contact $a_1$ of the relay A is opened so that the relay C is deenergized. Therefore, the pilot lamp 49 is turned off after a flash thereof. Moreover, in response to the switch of the contact $a_4$, the relay B is energized and self-held by the close of the contact $b_1$. Therefore, the pilot lamp 46 is continuously turned on. In response to the energization of the relay B, the contacts $b_3$ and $b_4$ of the relay B are switched. When the contact $b_4$ is switched, the relay A is energized and the pilot lamp 40 is turned on in response to the close of the contact $a_2$ of the relay A. However, since the relay A is deenergized in response to the switch of the contact $a_4$ of the relay A, the pilot lamp 40 is again turned off. When the contact $a_4$ is restored in response to the deenergization of the relay A, the relay A is again energized. Accordingly, the pilot lamp 40 for indication the test result of the first group of series-connected conductors flickers.

As mentioned above, the example of the test circuit 26 shown in FIG. 3 has a defect in which the test result is misindicated as mentioned above. This misoperation is caused by a construction in that means for energizing at first the relay A (comprising contacts $m_4$, $i_4$, $(i-1)_4$, .... $b_4$, $a_4$, 30-1s and 30-0s) is directly connected to the terminal 1a in parallel with contacts $a_1$ and $b_3$. Accordingly, the energization circuit for the relay A is different from the energization circuit for another of the succeeding relays B, C, ... I.

FIG. 4 shows another example of a part of the test circuit 26 eliminatable of the above-mentioned defect. In this example, a relay R having contacts $r_1$ and $r_2$ and a relay S having contacts $s_1$, $s_2$ and $s_3$ are provided. Moreover, the forementioned means for energizing at first the relay A is indirectly coupled with the energization circuit of the relay A. In this example, the relay R is at first in any case energized by a current flowing through a loop: the DC source 59, the relay R, contacts $m_4$, $i_4$, $(i-1)_4$, ... $b_4$, $a_4$, $s_2$, $r_2$, 30-1s, and 30-0s and switches 32 and 58, so that the relay R is self-held by the contact $r_1$. In response to the energization of the relay R, the contact $r_2$ is also switched so that the relay S is energized. In response to the energization of the switch S, the contacts $s_1$, $s_2$ and $s_3$ are switched so that the self-holding of the relay R is released by the open of the contact $s_3$. When the contact $r_2$ is restored in response to the deenergization of the relay R, the relay A is energized through the switched contacts $s_2$, the restored contact $r_2$ and contacts 30-1s and 30-0s since the first group of series-connected conductors is connected across the terminals 1a and 1b. In response to the energization of the relay A, the contact $a_3$ is opened so that the self-holding of the relay S is released. The following operation are the same as described before. Accordingly, when the switch 32 is switched on in this example, the relay A is energized after a delay time determined by the successive energization of the relay R and S. In other words, means for energizing at first the relay (A) used to test the first group of series-connected conductors energizes the relay A after the delay time starting from the switching on of the switch 32. As the result of this construction as mentioned above, the energization circuit of the relay A becomes the same as those of the succeeding relays B, C, ... I. Therefore, the above-mentioned misoperation of the example shown in FIG. 3 can be eliminated by the example shown in FIG. 4.

In this example shown in FIG. 4, another type of circuit for measuring an insulation resistance between the above-mentioned two sets of series-connected conductors in odd numbers of groups and in even numbers of groups is shown. In this circuit, a direct-current is supplied from the DC source 59 to an oscillator 100 through a resistance 79 in stabilizing by a Zener diode 74. Accordingly, the oscillator 100 generates an alternating current. This AC output of the oscillator 100 is rectified by a voltage doubler rectifying circuit comprising diodes 101 and 102 and capacitors 103 and 104. The DC output of the voltage doubler rectifying circuit is supplied, through resistances 105 and 106 and a current meter 107, to lines 93 and 94.

Before measuring the insulation resistance, contacts of the rotary switch 30 are set to the neutral positions, and the resistance of the variable resistor 106 is adjusted so that the indicator of the current meter 107 indicates the full scale. After the above mentioned preadjustment, contacts of the rotary switch 30 are switched to "insulation test" position of right side contacts 30-3t, 30-3s, ..... In this case, since the above-mentioned two sets of series-connected conductors are respectively connected to lines 94 and 93, the indicator of the current meter 107 indicates a scale corresponding to the insulator resistance between the above-mentioned two sets of series-connected conductors.

What we claim is:

1. An automatic testing device for a multiconductor electric cable two ends of which are respectively connected to two connectors, comprising:
   a first connection adapted coupled to one of the two connectors and having the same number of terminals as the number of connectors of the multiconductor electric cable, the terminals of this first connection adapter being paired off so as to form a plurality of series-connected pairs of terminals;

a second connection adapter coupled to the other of the connectors and having the same number of terminals as the number of conductors of the multiconductor electric cable, the terminals of this second connection adapter being paired off except some of the terminals the number of which is equal to twice a desired number of groups so that the conductors of the multiconductor electric cable are divided into said desired number of groups of series-connected conductors, the paired terminals of said series-connected conductors corresponding to respective pairs of said some of the terminals of the second connection adapter, a plurality of testing means respectively connected to said terminals of the groups of series-connected conductors to assume each an ON-state if corresponding one of the groups of the series-connected conductors forms a complete series connection;

a first control means coupled with a first one of the testing means testing the fist group of the series-connected conductors to start at first said first one of the testing means;

a plurality of self-hold means coupled respectively to the testing means to self-hold said ON-state thereof;

a plurality of second control means each coupled with corresponding one of the testing means to energize the just succeeding one of the testing means in response to said ON-state of the corresponding one of the testing means;

a plurality of release means each coupled to successive two of the testing means to release the ON-state of the preceding one of said successive two of the testing means in response to the ON-state of the succeeding one of the successive two of the testing means; and display means coupled to a plurality of said testing means to display the test results of the testing means.

2. An automatic testing device according to claim 1, in which the first control means is directly coupled to the first one of the testing means testing the first group of the series-connected conductors, so that the first one of the testing means assumes at once the ON-state in response to power supply to the testing means if the series-connected conductors connected to the first one of the testing means forms a complete series-connection.

3. An automatic testing device according to claim 1, in which the first control means is indirectly coupled to the first one of the testing means testing the first group of the series-connected conductors, so that the first one of the testing means assumes the ON-state after a delay time from power supply to the testing means if the series-connected conductors connected to the first one of the testing means forms a complete series connection.

4. An automatic testing device according to claim 1, including means for dividing the groups of the series-connected conductors into two sets of groups, and means for testing an insulation resistance between said two sets of groups.